US012030999B2

(12) United States Patent
Sato et al.

(10) Patent No.: US 12,030,999 B2
(45) Date of Patent: Jul. 9, 2024

(54) METHOD FOR PRODUCING FIBER-REINFORCED COMPOSITE MATERIAL

(71) Applicant: MITSUBISHI GAS CHEMICAL COMPANY, INC., Chiyoda-ku (JP)

(72) Inventors: Yuuki Sato, Kanagawa (JP); Kousuke Ikeuchi, Kanagawa (JP); Nobuhiko Matsumoto, Kanagawa (JP)

(73) Assignee: MITSUBISHI GAS CHEMICAL COMPANY, INC., Chiyoda-ku (JP)

( * ) Notice: Subject to any disclaimer, the term of this patent is extended or adjusted under 35 U.S.C. 154(b) by 0 days.

(21) Appl. No.: 17/904,344

(22) PCT Filed: Apr. 14, 2021

(86) PCT No.: PCT/JP2021/015394
§ 371 (c)(1),
(2) Date: Aug. 16, 2022

(87) PCT Pub. No.: WO2021/229985
PCT Pub. Date: Nov. 18, 2021

(65) Prior Publication Data
US 2023/0066520 A1     Mar. 2, 2023

(30) Foreign Application Priority Data

May 15, 2020   (JP) ................................ 2020-085887

(51) Int. Cl.
*C08J 5/04*     (2006.01)
(52) U.S. Cl.
CPC ........... *C08J 5/042* (2013.01); *C08J 2333/24* (2013.01)
(58) Field of Classification Search
CPC ... C08J 5/042; C08J 5/0405; C08J 5/04; C08J 2333/24; C08L 79/04; C08L 79/08; C08K 2201/002; C08K 3/04; C08K 3/046; C08K 3/08; C08K 3/40
See application file for complete search history.

(56) References Cited

U.S. PATENT DOCUMENTS

| | | | |
|---|---|---|---|
| 9,873,767 B2* | 1/2018 | Sato | .................... C08G 73/1082 |
| 10,174,167 B2* | 1/2019 | Sato | .................... C08G 73/1075 |
| 2016/0177062 A1 | 6/2016 | Sato et al. | |
| 2017/0130003 A1 | 5/2017 | Sato | |
| 2018/0362760 A1* | 12/2018 | Imai | ....................... B29C 70/521 |
| 2023/0220170 A1* | 7/2023 | Takehara | ................. B29C 70/20 524/1 |
| 2023/0347634 A1* | 11/2023 | Kuwajima | ............. B32B 27/322 |

FOREIGN PATENT DOCUMENTS

| | | |
|---|---|---|
| JP | 2011-66170 A | 3/2011 |
| JP | 2014-51587 A | 3/2014 |
| JP | 2020-19897 A | 2/2020 |
| WO | WO 2015/020020 A1 | 2/2015 |
| WO | WO 2015/020220 A1 | 2/2015 |
| WO | WO 2016/147996 A1 | 9/2016 |
| WO | WO 2019/220967 A1 | 11/2019 |

OTHER PUBLICATIONS

International Search Report mailed on Jul. 6, 2021 in PCT/JP2021/015394 filed on Apr. 14, 2021 (2 pages).

* cited by examiner

*Primary Examiner* — Jane L Stanley
(74) *Attorney, Agent, or Firm* — Oblon, McClelland, Maier & Neustadt, L.L.P.

(57) ABSTRACT

A method for producing a fiber-reinforced composite material containing a polyimide resin (A) having a predetermined repeating unit and a continuous reinforcing fiber (B), the method including the following steps (I) and (II) in this order:

step (I): a step of laminating at least one polyimide resin (A) layer and at least one continuous reinforcing fiber (B) layer to obtain a laminated product; and step (II): a step of molding the laminated product by heating and pressurizing under a condition where a working parameter X expressed by the following expression (i) is 35 or more and 87 or less:

$X=(Tp-Tm)^3 \times P^{1/2}/1000$      (i)

wherein in the expression (i), Tp represents a temperature (° C.) during the molding, Tm represents a melting point (° C.) of the polyimide resin (A), and P represents a press pressure (MPa) during the molding.

9 Claims, 2 Drawing Sheets

METHOD FOR PRODUCING FIBER-REINFORCED COMPOSITE MATERIAL

CROSS-REFERENCE TO RELATED APPLICATIONS

The present application is a 35 U.S.C. § 371 national stage application of international application PCT/JP2021/015394, filed Apr. 14, 2021, which is based on and claims the benefit of priority to Japanese Patent Application No. 2020-085887, filed on May 15, 2020. The entire contents of these applications are incorporated herein by reference.

TECHNICAL FIELD

The present invention relates to a method for producing a fiber-reinforced composite material.

An electromagnetic wave shielding material is a member that attenuates electromagnetic wave energy by reflection and absorption of electromagnetic waves, and adverse effects of the electromagnetic waves on the human body and precision equipment can be avoided by attenuating the electromagnetic waves.

A material using a thermoplastic resin and carbon fibers is known as the electromagnetic wave shielding material. For example, Patent Literature 1 discloses a method for producing an electromagnetic wave shielding member including the steps of: impregnating a continuous carbon fiber with a polymerizable composition composed of a cycloolefin monomer, a metathesis polymerization catalyst, a radical generating agent and a discontinuous carbon fiber, and then performing a bulk polymerization at a predetermined temperature range to obtain a resin-impregnated base material formed by impregnating the carbon fiber with a cycloolefin polymer; and crosslinking the resin-impregnated base material obtained in the step with the thermoplastic resin being in contact with the base material to obtain an electromagnetic wave shielding member composed of a resin-impregnated base material-thermoplastic resin composite.

Patent Literature 2 discloses that a molded article obtained from a thermoplastic resin composition containing a thermoplastic resin and carbon fibers with a predetermined compositional makeup and length has good thermal conductivity and electromagnetic wave shielding properties.

The electromagnetic wave shielding materials described in Patent Literatures 1 and 2 both exhibit a shielding property of about 40 to 50 dB in measurement at a frequency of 100 MHz to 1,000 MHz.

As a method for producing an electromagnetic wave shielding material, Patent Literature 1 discloses that an electromagnetic wave shielding material composed of a resin-impregnated base material-thermoplastic resin composite is obtained by placing a resin-impregnated base material in a mold, and then injecting and charging a thermoplastic resin into the mold to bring them into contact with each other. Patent Literature 2 discloses that a molded article is obtained by a known resin molding method such as injection molding.

A method for laminating a thermoplastic resin film and continuous carbon fibers and subjecting them to heat and pressure molding can also be used as a method for producing a fiber-reinforced composite material using a thermoplastic resin and continuous reinforcing fibers. For example, Patent Literature 3 discloses in [0246] that a polyimide resin film and a carbon fiber opened yarn fabric are laminated to obtain a plate-like composite material by using a vacuum pressing apparatus. Patent Literature 4 also discloses that a continuous reinforcing fiber such as glass cloth and a thermoplastic resin film are stacked to form a molded base material, and a molded article is produced by heat and pressure molding.

CITATION LIST

Patent Literature

PTL 1: JP 2011-66170 A
PTL 2: JP 2014-51587 A
PTL 3: WO 2015/020220
PTL 4: JP 2020-19897 A

SUMMARY OF INVENTION

Technical Problem

According to a study by the present inventors, however, it has been found that a fiber-reinforced composite material obtained by molding a laminate of a thermoplastic resin film and continuous carbon fiber by heating and pressurizing have electromagnetic wave shielding performance that tends to depend on production conditions of the fiber-reinforced composite material.

An object of the present invention is to provide a method for producing a fiber-reinforced composite material containing a thermoplastic resin and a continuous reinforcing fiber and having excellent electromagnetic wave shielding performance.

Solution to Problem

The present inventors have found that the aforementioned object can be attained by laminating at least one polyimide resin layer and at least one continuous reinforcing fiber layer and performing heat and pressure molding under conditions where the melting point of the polyimide resin and the temperature and press pressure during the molding satisfy a predetermined relationship in the method for producing a fiber-reinforced composite material containing a predetermined crystalline thermoplastic polyimide resin and a continuous reinforcing fiber.

That is, the present invention relates to a method for producing a fiber-reinforced composite material containing a polyimide resin (A) and a continuous reinforcing fiber (B), wherein the polyimide resin (A) contains a repeating structural unit represented by the following formula (1) and a repeating structural unit represented by the following formula (2), and a content ratio of the repeating structural unit of the formula (1) with respect to the total of the repeating structural unit of the formula (1) and the repeating structural unit of the formula (2) is 20 to 70 mol %:

(1)

-continued (2)

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic ring, the method including the following steps (I) and (II) in this order:

step (I): a step of laminating at least one polyimide resin (A) layer and at least one continuous reinforcing fiber (B) layer to obtain a laminated product; and step (II): a step of molding the laminated product by heating and pressurizing under a condition where a working parameter X expressed by the following expression (i) is 35 or more and 87 or less:

$$X = (Tp - Tm)^3 \times P^{1/2}/1000 \qquad (i)$$

wherein in the expression (i), Tp represents a temperature (° C.) during the molding, Tm represents a melting point (° C.) of the polyimide resin (A), and P represents a press pressure (MPa) during the molding.

Advantageous Effects of Invention

According to the present invention, a method for producing a fiber-reinforced composite material can be provided that contains a thermoplastic resin and a continuous reinforcing fiber and has excellent electromagnetic wave shielding performance.

DESCRIPTION OF EMBODIMENTS

[Method for Producing Fiber-Reinforced Composite Material]

The method for producing a fiber-reinforced composite material of the present invention (hereinafter, also simply referred to as the "method of the present invention") is a method for producing a fiber-reinforced composite material containing a polyimide resin (A) and a continuous reinforcing fiber (B), wherein the polyimide resin (A) contains a repeating structural unit represented by the following formula (1) and a repeating structural unit represented by the following formula (2), and a content ratio of the repeating structural unit of the formula (1) with respect to the total of the repeating structural unit of the formula (1) and the repeating structural unit of the formula (2) is 20 to 70 mol %:

(1)

(2)

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic ring, the method being characterized by including the following steps (I) and (II) in this order:

step (I): a step of laminating at least one polyimide resin (A) layer and at least one continuous reinforcing fiber (B) layer to obtain a laminated product; and step (II): a step of molding the laminated product by heating and pressurizing under a condition where a working parameter X expressed by the following expression (i) is 35 or more and 87 or less:

$$X = (Tp - Tm)^3 \times P^{1/2}/1000 \qquad (i)$$

wherein in the expression (i), Tp represents a temperature (° C.) during the molding, Tm represents a melting point (° C.) of the polyimide resin (A), and P represents a press pressure (MPa) during the molding.

As used herein, the press pressure during the molding means a gauge pressure.

The fiber-reinforced composite material having excellent electromagnetic wave shielding performance can be produced by the production method of the present invention including the steps (I) and (II) in this order.

Although the reason why the aforementioned effects are obtained by the present invention is not certain, it is considered as follows.

The polyimide resin (A) is a crystalline thermoplastic resin and has the melting point Tm. A fiber-reinforced composite material obtained by impregnating the continuous reinforcing fiber (B) with the polyimide resin (A) as a matrix resin can be produced by laminating a polyimide resin (A) layer obtained by molding this polyimide resin (A) into a film or the like and a continuous reinforcing fiber (B) layer and subjecting to heat and pressure molding. The fiber-reinforced composite material containing the polyimide resin (A) having a specific amount of a predetermined repeating structural unit and the continuous reinforcing fiber (B) (hereinafter, also simply referred to as the "composite material") exhibits excellent electromagnetic wave shielding performance.

The present inventors further have found that the electromagnetic wave shielding performance of a composite material containing the polyimide resin (A) and the continuous reinforcing fiber (B) depends not only on the type of material used but also on the production method thereof, and in particular, it is important that the relationship between temperature and press pressure during heat and pressure molding satisfies predetermined requirements.

In theory, the temperature Tp during the heat and pressure molding of the composite material may be a temperature exceeding the melting point Tm of the polyimide resin (A). However, since the flowability of the resin is generally low when the difference Tp–Tm is small, it requires an increased press pressure P during the molding in order to impregnate the continuous reinforcing fiber (B) with the polyimide resin (A). On the other hand, if the Tp–Tm is large, the polyimide resin (A) can be easily impregnated in the continuous reinforcing fiber (B) even at a low press pressure P during the molding. If the flowability of the polyimide resin (A) is too high, however, the resin flows out of the system in the molding process, and it causes the problem that a sufficient amount of the resin is not impregnated in the continuous reinforcing fiber (B).

Further, since the temperature has a greater influence on the relationship between the temperature and the press pressure during the molding, in the present invention, the laminated product is molded in the step (II) under a condition where the working parameter X proportional to the product of the cube of (Tp–Tm) expressed by the expression (i) and the square root of P is within a predetermined range. As a result, it is thought that the outflow of the polyimide resin (A) to the outside of the system is suppressed, and the generation of voids due to insufficient impregnation of the continuous reinforcing fiber (B) is suppressed, whereby a composite material having excellent electromagnetic wave shielding performance is obtained.

<Fiber-Reinforced Composite Material>

The fiber-reinforced composite material produced by the method of the present invention contains a polyimide resin (A) and a continuous reinforcing fiber (B), wherein the polyimide resin (A) contains a repeating structural unit represented by the following formula (1) and a repeating structural unit represented by the following formula (2), and a content ratio of the repeating structural unit of the formula (1) with respect to the total of the repeating structural unit of the formula (1) and the repeating structural unit of the formula (2) is 20 to 70 mol %:

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic ring.

(Polyimide Resin (A))

The polyimide resin (A) used in the present invention contains a repeating structural unit represented by the following formula (1) and a repeating structural unit represented by the following formula (2), a content ratio of the repeating structural unit of the formula (1) with respect to the total of the repeating structural unit of the formula (1) and the repeating structural unit of the formula (2) being 20 to 70 mol %:

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic ring.

The polyimide resin (A) used in the present invention is a thermoplastic resin, which is preferably in a powder or pellet form. The thermoplastic polyimide resin is distinguished from, for example, polyimide resins formed by closing the imide ring after shaping in a state of a polyimide precursor such as a polyamic acid and having no glass transition temperature (Tg), or polyimide resins that decompose at a temperature lower than the glass transition temperature.

The repeating structural unit of formula (1) will be described in detail below.

$R_1$ represents a divalent group having from 6 to 22 carbon atoms containing at least one alicyclic hydrocarbon structure. The alicyclic hydrocarbon structure herein means a ring derived from an alicyclic hydrocarbon compound, and the alicyclic hydrocarbon compound may be either saturated or unsaturated and may be either monocyclic or polycyclic.

Examples of the alicyclic hydrocarbon structure include a cycloalkane ring, such as a cyclohexane ring, a cycloalkene ring, such as cyclohexene, a bicycloalkane ring, such as a norbornane ring, and a bicycloalkene ring, such as norbornene, but the alicyclic hydrocarbon structure is not limited thereto. Among these, a cycloalkane ring is preferred, a cycloalkane ring having from 4 to 7 carbon atoms is more preferred, and a cyclohexane ring is further preferred.

$R_1$ has from 6 to 22 carbon atoms, and preferably from 8 to 17 carbon atoms.

$R_1$ contains at least one alicyclic hydrocarbon structure, and preferably from 1 to 3 alicyclic hydrocarbon structures.

$R_1$ is preferably a divalent group represented by the following formula (R1-1) or (R1-2):

(R1-1)

(R1-2)

wherein $m_{11}$ and $m_{12}$ each independently represent an integer of 0-2, and preferably 0 or 1; and $m_{13}$ to $m_{15}$ each independently represent an integer of 0-2, and preferably 0 or 1.

$R_1$ is particularly preferably a divalent group represented by the following formula (R1-3):

(R1-3)

In the divalent group represented by the formula (R1-3), the conformation of the two methylene groups with respect to the cyclohexane ring may be either cis or trans, and the ratio of cis and trans may be an arbitrary value.

$X_1$ is a tetravalent group having from 6 to 22 carbon atoms containing at least one aromatic ring. The aromatic ring may be either a monocyclic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.

$X_1$ has from 6 to 22 carbon atoms, and preferably has from 6 to 18 carbon atoms.

$X_1$ contains at least one aromatic ring, and preferably contains from 1 to 3 aromatic rings.

$X_1$ is preferably a tetravalent group represented by one of the following formulae (X-1) to (X-4):

(X-1)

(X-2)

(X-3)

(X-4)

wherein $R_{11}$ to $R_{18}$ each independently represent an alkyl group having from 1 to 4 carbon atoms; $p_{11}$ to $p_{13}$ each independently represent an integer of 0-2, and preferably 0; $p_{14}$, $p_{15}$, $p_{16}$, and $p_{18}$ s each independently represent an integer of 0-3, and preferably 0; $p_{17}$ represents an integer of 0-4, and preferably 0; and $L_{11}$ to $L_{13}$ each independently represent a single bond, an ether group, a carbonyl group or an alkylene group having from 1 to 4 carbon atoms.

$X_1$ is a tetravalent group having from 6 to 22 carbon atoms containing at least one aromatic ring, and therefore $R_{12}$, $R_{13}$, $p_{12}$ and $p_{13}$ in the formula (X-2) are selected in such a manner that the tetravalent group represented by the formula (X-2) has from 10 to 22 carbon atoms.

Similarly, $L_{11}$, $R_{14}$, $R_{15}$, $p_{14}$ and $p_{15}$ in the formula (X-3) are selected in such a manner that the tetravalent group represented by the formula (X-3) has from 12 to 22 carbon atoms, and $L_{12}$, $L_{13}$, $R_{16}$, $R_{17}$, $R_{18}$, $p_{16}$, $p_{17}$ and $p_{18}$ in the formula (X-4) are selected in such a manner that the tetravalent group represented by the formula (X-4) has from 18 to 22 carbon atoms.

$X_1$ is particularly preferably a tetravalent group represented by the following formula (X-5) or (X-6):

(X-5)

(X-6)

Next, the repeating structural unit of formula (2) will be described in detail below.

$R_2$ represents a divalent chain aliphatic group having from 5 to 16 carbon atoms, preferably from 6 to 14 carbon atoms, more preferably from 7 to 12 carbon atoms, and further preferably from 8 to 10 carbon atoms. The chain aliphatic group herein means a group derived from a chain aliphatic compound, and the chain aliphatic compound may be either saturated or unsaturated, may be in the form of either linear or branched chain, and may contain a hetero atom, such as an oxygen atom.

$R_2$ is preferably an alkylene group having from 5 to 16 carbon atoms, more preferably an alkylene group having from 6 to 14 carbon atoms, further preferably an alkylene group having from 7 to 12 carbon atoms, and particularly preferably an alkylene group having from 8 to 10 carbon atoms. The alkylene group may be either a linear alkylene group or a branched alkylene group, and is preferably a linear alkylene group.

$R_2$ preferably represents at least one selected from the group consisting of an octamethylene group and a decamethylene group, and particularly preferably represents an octamethylene group.

Another preferred embodiment of $R_2$ is a divalent chain aliphatic group having from 5 to 16 carbon atoms containing an ether group. The divalent chain aliphatic group preferably has from 6 to 14 carbon atoms, more preferably from 7 to 12 carbon atoms, and further preferably from 8 to 10 carbon atoms. Preferred examples of the group include a divalent group represented by the following formula (R2-1) or (R2-2):

$$—(CH_2)_{m21}—O—(CH_2)_{m22}— \quad \text{(R2-1)}$$

$$—(CH_2)_{m23}—O—(CH_2)_{m24}—O—(CH_2)_{m25}— \quad \text{(R2-2)}$$

wherein $m_{21}$ and $m_{22}$ each independently represent an integer of 1-15, preferably 1-13, more preferably 1-11, and further preferably 1-9; and $m_{23}$ to $m_{25}$ each independently represent an integer of 1-14, preferably 1-12, more preferably 1-10, and further preferably 1-8.

$R_2$ represents a divalent chain aliphatic group having from 5 to 16 carbon atoms (preferably from 6 to 14 carbon atoms, more preferably from 7 to 12 carbon atoms, and further preferably from 8 to 10 carbon atoms), and therefore $m_{21}$ and $m_{22}$ in the formula (R2-1) are selected so that the divalent group represented by the formula (R2-1) has from 5 to 16 carbon atoms (preferably from 6 to 14 carbon atoms, more preferably from 7 to 12 carbon atoms, and further preferably from 8 to 10 carbon atoms), i.e., $m_{21}+m_{22}$ is from 5 to 16 (preferably 6 to 14, more preferably 7 to 12, and further preferably 8 to 10).

Similarly, $m_{23}$ to $m_{25}$ in the formula (R2-2) are selected so that the divalent group represented by the formula (R2-2) has from 5 to 16 carbon atoms (preferably from 6 to 14 carbon atoms, more preferably from 7 to 12 carbon atoms, and further preferably from 8 to 10 carbon atoms), i.e., $m_{23}+m_{24}+m_{25}$ is from 5 to 16 (preferably from 6 to 14 carbon atoms, more preferably from 7 to 12 carbon atoms, and further preferably from 8 to 10 carbon atoms).

$X_2$ is defined similarly to $X_1$ in the formula (1), and preferred embodiments thereof are also the same.

The content ratio of the repeating structural unit of the formula (1) with respect to the total of the repeating structural unit of the formula (1) and the repeating structural unit of the formula (2) is 20 mol % to 70 mol %. In the case where the content ratio of the repeating structural unit of the formula (1) is in the above range, the polyimide resin may also be sufficiently crystallized in an ordinary injection molding cycle. When the content ratio is less than 20 mol %, molding processability is deteriorated, and when the content ratio is more than 70 mol %, crystallinity is deteriorated to thereby result in deterioration in heat resistance.

The content ratio of the repeating structural unit of the formula (1) with respect to the total of the repeating structural unit of the formula (1) and the repeating structural unit of the formula (2) is preferably 65 mol % or less, more preferably 60 mol % or less, and further preferably 50 mol % or less from the viewpoint of exhibiting high crystallinity.

Among these, the content ratio of the repeating structural unit of the formula (1) with respect to the total of the repeating structural unit of the formula (1) and the repeating structural unit of the formula (2) is preferably 20 mol % or more and less than 40 mol %. When the ratio falls within this range, the crystallinity of the polyimide resin (A) increases, and it is possible to obtain a resin composition being more excellent in heat resistance.

The content ratio described above is preferably 25 mol % or more, more preferably 30 mol % or more, further preferably 32 mol % or more from the viewpoint of molding processability, and is further preferably 35 mol % or less from the viewpoint of exhibiting high crystallinity.

The content ratio of the total of the repeating structural unit of the formula (1) and the repeating structural unit of the formula (2) with respect to the total repeating structural units constituting the polyimide resin (A) is preferably 50 to 100 mol %, more preferably 75 to 100 mol %, further preferably 80 to 100 mol %, and still further preferably 85 to 100 mol %.

The polyimide resin (A) may further contain a repeating structural unit represented by the following formula (3). In this case, the content ratio of the repeating structural unit of formula (3) with respect to the total of the repeating structural unit of formula (1) and the repeating structural unit of formula (2) is preferably 25 mol % or less. The lower limit thereof is not particularly limited but needs to exceed 0 mol %.

From the viewpoint of improving heat resistance, the content ratio is preferably 5 mol % or more, and more preferably 10 mol % or more, while from the viewpoint of maintaining crystallinity, the content ratio is preferably 20 mol % or less, and more preferably 15 mol % or less.

(3)

wherein $R_3$ represents a divalent group having from 6 to 22 carbon atoms containing at least one aromatic ring; and $X_3$ represents a tetravalent group having from 6 to 22 carbon atoms containing at least one aromatic ring.

$R_3$ is a divalent group having from 6 to 22 carbon atoms containing at least one aromatic ring. The aromatic ring may be either a monocyclic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.

$R_3$ has from 6 to 22 carbon atoms, and preferably has from 6 to 18 carbon atoms.

$R_3$ contains at least one aromatic ring, and preferably contains from 1 to 3 aromatic rings.

The aromatic ring may also be bonded to a monovalent or divalent electron-attracting group. Examples of the monovalent electron-attracting group include a nitro group, a cyano group, a p-toluenesulfonyl group, halogen, an alkyl halide group, a phenyl group, and an acyl group. Examples of the divalent electron-attracting group include alkylene halide groups such as alkylene fluoride groups (e.g., $—C(CF_3)_2—$ and $—(CF_2)_p—$ (wherein p is an integer of 1-10)), as well as $—CO—$, $—SO_2—$, $—SO—$, $—CONH—$, and $—COO—$.

$R_3$ is preferably a divalent group represented by the following formula (R3-1) or (R3-2):

(R3-1)

-continued (R3-2)

wherein $m_{31}$ and $m_{32}$ each independently represent an integer of 0-2, and preferably 0 or 1; $m_{33}$ and $m_{34}$ each independently represent an integer of 0-2, and preferably 0 or 1; $R_{21}$, $R_{22}$, and $R_{23}$ each independently represent an alkyl group having from 1 to 4 carbon atoms, an alkenyl group having from 2 to 4 carbon atoms or an alkynyl group having from 2 to 4 carbon atoms; $p_{21}$, $p_{22}$, and $p_{23}$ each represent an integer of 0-4, and preferably 0; and $L_{21}$ represents a single bond, an ether group, a carbonyl group or an alkylene group having from 1 to 4 carbon atoms.

$R_3$ is a divalent group having from 6 to 22 carbon atoms containing at least one aromatic ring, and therefore $m_{31}$, $m_{32}$, $R_{21}$ and $p_{21}$ in the formula (R3-1) are selected in such a manner that the divalent group represented by the formula (R3-1) has from 6 to 22 carbon atoms.

Similarly, $L_{21}$, $m_{33}$, $m_{34}$, $R_{22}$, $R_{23}$, $p_{22}$ and $p_{23}$ in the formula (R3-2) are selected in such a manner that the divalent group represented by the formula (R3-2) has from 12 to 22 carbon atoms.

$X_3$ is defined similarly to $X_1$ in the formula (1), and preferred embodiments thereof are also the same.

The polyimide resin (A) may further contain a repeating structural unit represented by the following formula (4):

(4)

wherein $R_4$ represents a divalent group containing —$SO_2$— or —$Si(R_x)(R_y)O$—; $R_x$ and $R_y$ each independently represent a chain aliphatic group having from 1 to 3 carbon atoms, or a phenyl group; and $X_4$ represents a tetravalent group having from 6 to 22 carbon atoms containing at least one aromatic ring.

$X_4$ is defined similarly to $X_1$ in the formula (1), and preferred embodiments thereof are also the same.

The end structure of the polyimide resin (A) is not particularly limited, and preferably has a chain aliphatic group having 5 to 14 carbon atoms at the end thereof.

The chain aliphatic group may be either saturated or unsaturated, and may be in the form of either linear or branched chain. When the polyimide resin (A) contains the above particular group at the end thereof, it is possible to obtain a resin composition excellent in heat aging resistance.

Example of the saturated chain aliphatic group having from 5 to 14 carbon atoms include an n-pentyl group, an n-hexyl group, an n-heptyl group, an n-octyl group, an n-nonyl group, an n-decyl group, an n-undecyl group, a lauryl group, an n-tridecyl group, an n-tetradecyl group, an isopentyl group, a neopentyl group, a 2-methylpentyl group, a 2-methylhexyl group, a 2-ethylpentyl group, a 3-ethylpentyl group, an isooctyl group, a 2-ethylhexyl group, a 3-ethylhexyl group, an isononyl group, a 2-ethyloctyl group, an isodecyl group, an isododecyl group, an isotridecyl group and an isotetradecyl group.

Example of the unsaturated chain aliphatic group having from 5 to 14 carbon atoms include a 1-pentenyl group, a 2-pentenyl group, a 1-hexenyl group, a 2-hexenyl group, a 1-heptenyl group, a 2-heptenyl group, a 1-octenyl group, a 2-octenyl group, a nonenyl group, a decenyl group, a dodecenyl group, a tridecenyl group, and a tetradecenyl group.

Among these, the chain aliphatic group is preferably a saturated chain aliphatic group, and more preferably a saturated linear aliphatic group. The chain aliphatic group preferably has 6 or more carbon atoms, more preferably 7 or more carbon atoms and further preferably 8 or more carbon atoms, and preferably has 12 or less carbon atoms, more preferably 10 or less carbon atoms and further preferably 9 or less carbon atoms from the viewpoint of achievement of heat aging resistance. The chain aliphatic group may be adopted singly or in combinations of two or more.

The chain aliphatic group is particularly preferably at least one selected from the group consisting of an n-octyl group, an isooctyl group, a 2-ethylhexyl group, an n-nonyl group, an isononyl group, an n-decyl group and an isodecyl group, further preferably at least one selected from the group consisting of an n-octyl group, an isooctyl group, a 2-ethylhexyl group, an n-nonyl group, and an isononyl group, and most preferably at least one selected from the group consisting of an n-octyl group, an isooctyl group, and a 2-ethylhexyl group.

The polyimide resin (A) preferably contains only a chain aliphatic group having from 5 to 14 carbon atoms, besides a terminal amino group and a terminal carboxy group, at the end thereof from the viewpoint of heat aging resistance. When a group, besides the above groups, is contained at the end, the content thereof with respect to the chain aliphatic group having from 5 to 14 carbon atoms is preferably 10 mol % or less and more preferably 5 mol % or less.

The content of the chain aliphatic group having from 5 to 14 carbon atoms in the polyimide resin (A) is preferably 0.01 mol % or more, more preferably 0.1 mol % or more, and further preferably 0.2 mol % or more based on the total 100 mol % of the total repeating structural units constituting the polyimide resin (A) from the viewpoint of exhibiting excellent heat aging resistance. Further, to ensure a sufficient molecular weight and obtain good mechanical properties, the content of the chain aliphatic group having from 5 to 14 carbon atoms in the polyimide resin (A) is, with respect to a total of 100 mol % of all the repeating structural units constituting the polyimide resin (A), preferably 10 mol % or less, more preferably 6 mol % or less, further preferably 3.5 mol % or less, still further preferably 2.0 mol % or less, and even still further preferably 1.2 mol % or less.

The content of the chain aliphatic group having from 5 to 14 carbon atoms in the polyimide resin (A) can be determined by depolymerization of the polyimide resin (A).

The polyimide resin (A) preferably has a melting point of 360° C. or lower and a glass transition temperature of 150° C. or higher. The melting point of the polyimide resin (A) is more preferably 280° C. or higher and further preferably 290° C. or higher from the viewpoint of heat resistance, and is preferably 345° C. or lower, more preferably 340° C. or lower, and further preferably 335° C. or lower from the viewpoint of exhibiting high molding processability. In addition, the glass transition temperature of the polyimide resin (A) is more preferably 160° C. or higher and more preferably 170° C. or higher from the viewpoint of heat resistance, and is preferably 250° C. or lower, more preferably 230° C. or lower, and further preferably 200° C. or lower from the viewpoint of exhibiting high molding processability.

The melting point and glass transition temperature of the polyimide resin (A) can all be measured by a differential scanning calorimeter.

In addition, in the polyimide resin (A), the exothermic amount (hereinafter, also simply referred to as "exothermic amount of crystallization") of the crystallization exothermic peak observed in melting and then cooling of the polyimide resin at a cooling rate of 20° C./min with differential scanning calorimetric measurement is preferably 5.0 mJ/mg or more, more preferably 10.0 mJ/mg or more, and further preferably 17.0 mJ/mg or more from the viewpoint of enhancement of crystallinity, heat resistance, mechanical strength, and chemical resistance. The upper limit of the exothermic amount of crystallization is not particularly limited, and is usually 45.0 mJ/mg or less.

The melting point, glass transition temperature, and exothermic amount of crystallization of the polyimide resin (A), specifically, can be measured by the methods described in the examples.

The logarithmic viscosity of the polyimide resin (A) at 30° C. in a 5 mass % concentrated sulfuric acid solution is preferably 0.2 to 2.0 dL/g and more preferably 0.3 to 1.8 dL/g. When the logarithmic viscosity is 0.2 dL/g or more, a molded article formed of the polyimide resin composition obtained has sufficient mechanical strength, and when the logarithmic viscosity is 2.0 dL/g or less, molding processability and handleability are good. The logarithmic viscosity is obtained according to the following expression by measuring the elapsed times for flowing concentrated sulfuric acid and the polyimide resin solution at 30° C. with a Cannon-Fenske viscometer.

$$\mu = \ln(ts/t_0)/C$$

$t_0$: elapsed time for flowing concentrated sulfuric acid
$ts$: elapsed time for flowing polyimide resin solution
C: 0.5 (g/dL)

The weight average molecular weight Mw of the polyimide resin (A) is preferably in the range of 10,000 to 150,000, more preferably 15,000 to 100,000, further preferably 20,000 to 80,000, still further preferably 30,000 to 70,000, and even still further preferably 35,000 to 65,000. When the weight average molecular weight Mw of the polyimide resin (A) is 10,000 or more, the mechanical strength is good, and when it is 150,000 or less, the molding processability is good.

The weight average molecular weight Mw of the polyimide resin (A) can be measured by a gel permeation chromatography (GPC) method using polymethyl methacrylate (PMMA) as a standard sample.

[Method for Producing Polyimide Resin (A)]

The polyimide resin (A) may be produced by reacting a tetracarboxylic acid component and a diamine component. The tetracarboxylic acid component contains a tetracarboxylic acid containing at least one aromatic ring and/or a derivative thereof, and the diamine component contains a diamine containing at least one alicyclic hydrocarbon structure and a chain aliphatic diamine.

The tetracarboxylic acid containing at least one aromatic ring is preferably a compound having four carboxy groups that are bonded directly to the aromatic ring, and may contain an alkyl group in the structure thereof. The tetracarboxylic acid preferably has from 6 to 26 carbon atoms. Preferred examples of the tetracarboxylic acid include pyromellitic acid, 2,3,5,6-toluenetetracarboxylic acid, 3,3', 4,4'-benzophenonetetracarboxylic acid, 3,3',4,4'-biphenyltetracarboxylic acid and 1,4,5,8-naphthalenetetracarboxylic acid. Among these, pyromellitic acid is more preferred.

Examples of the derivative of the tetracarboxylic acid containing at least one aromatic ring include an anhydride and an alkyl ester compound of a tetracarboxylic acid containing at least one aromatic ring. The derivative of the tetracarboxylic acid preferably has from 6 to 38 carbon atoms. Examples of the anhydride of the tetracarboxylic acid include pyromellitic monoanhydride, pyromellitic dianhydride, 2,3,5,6-toluenetetracarboxylic dianhydride, 3,3',4,4'-diphenylsulfonetetracarboxylic dianhydride, 3,3',4,4'-benzophenonetetracarboxylic dianhydride, 3,3',4,4'-biphenyltetracarboxylic dianhydride and 1,4,5,8-naphthalenetetracarboxylic dianhydride. Examples of the alkyl ester compound of the tetracarboxylic acid include dimethyl pyromellitate, diethyl pyromellitate, dipropyl pyromellitate, diisopropyl pyromellitate, dimethyl 2,3,5,6-toluenetetracarboxylate, dimethyl 3,3',4,4'-diphenylsulfonetetracarboxylate, dimethyl 3,3',4,4'-benzophenonetetracarboxylate, dimethyl 3,3',4,4'-biphenyltetracarboxylate and dimethyl 1,4,5,8-naphthalenetetracarboxylate. The alkyl group in the alkyl ester compound of the tetracarboxylic acid preferably has from 1 to 3 carbon atoms.

The tetracarboxylic acid containing at least one aromatic ring and/or the derivative thereof may be used as a sole compound selected from the aforementioned compounds or may be used as a combination of two or more compounds.

The diamine containing at least one alicyclic hydrocarbon structure preferably has from 6 to 22 carbon atoms, and preferred examples thereof include 1,2-bis(aminomethyl)cyclohexane, 1,3-bis(aminomethyl)cyclohexane, 1,4-bis(aminomethyl)cyclohexane, 1,2-cyclohexanediamine, 1,3-cyclohexanediamine, 1,4-cyclohexanediamine, 4,4'-diaminodicyclohexylmethane, 4,4'-methylenebis(2-methylcyclohexylamine), carvone diamine, limonene diamine, isophorone diamine, norbornane diamine, bis(aminomethyl)tricyclo[5.2.1.0$^{2,6}$]decane, 3,3'-dimethyl-4,4'-diaminodicyclohexylmethane and 4,4'-diaminodicyclohexylpropane. These compounds may be used solely or may be used as a combination of two or more compounds selected therefrom. Among these, 1,3-bis(aminomethyl)cyclohexane is preferably used. A diamine containing an alicyclic hydrocarbon structure generally has conformational isomers, and the ratio of the cis isomer and the trans isomer is not particularly limited.

The chain aliphatic diamine may be in the form of either linear or branched chain, and has preferably from 5 to 16 carbon atoms, more preferably from 6 to 14 carbon atoms and further preferably from 7 to 12 carbon atoms. The linear moiety having from 5 to 16 carbon atoms may contain an ether bond in the course thereof. Preferred examples of the chain aliphatic diamine include 1,5-pentamethylenediamine, 2-methylpentane-1,5-diamine, 3-methylpentane-1,5-diamine, 1,6-hexamethylenediamine, 1,7-heptamethylenediamine, 1,8-octamethylenediamine, 1,9-nonamethylenediamine, 1,10-decamethylenediamine, 1,11-undecamethylenediamine, 1,12-dodecamethylenediamine, 1,13-tridecamethylenediamine, 1,14-tetradecamethylenediamine, 1,16-hexadecamethylenediamine, and 2,2'-(ethylenedioxy)bis(ethyleneamine).

The chain aliphatic diamine may be used as a sole compound or as a mixture of plural kinds thereof. Among these, a chain aliphatic diamine having from 8 to 10 carbon atoms can be preferably used, and at least one selected from the group consisting of 1,8-octamethylenediamine and 1,10-decamethylenediamine can be particularly preferably used.

In the production of the polyimide resin (A), the molar ratio of the charged amount of the diamine containing at least one alicyclic hydrocarbon structure with respect to the total amount of the diamine containing at least one alicyclic hydrocarbon structure and the chain aliphatic diamine is preferably 20 to 70 mol %. The molar ratio is preferably 25 mol % or more, more preferably 30 mol % or more, further preferably 32 mol % or more, and is preferably 60 mol % or less, more preferably 50 mol % or less, further preferably less than 40 mol, and further preferably 35 mol % or less from the viewpoint of exhibiting high crystallinity.

The diamine component may contain a diamine containing at least one aromatic ring. The diamine containing at least one aromatic ring preferably has from 6 to 22 carbon atoms, and examples thereof include o-xylylenediamine, m-xylylenediamine, p-xylylenediamine, 1,2-diethynylbenzenediamine, 1,3-diethynylbenzenediamine, 1,4-diethynylbenzenediamine, 1,2-diaminobenzene, 1,3-diaminobenzene, 1,4-diaminobenzene, 4,4'-diaminodiphenyl ether, 3,4'-diaminodiphenyl ether, 4,4'-diaminodiphenylmethane, α,α'-bis(4-aminophenyl)-1,4-diisopropylbenzene, α,α'-bis(3-aminophenyl)-1,4-diisopropylbenzene, 2,2-bis(4-(4-aminophenoxy)phenyl)propane, 2,6-diaminonaphthalene, and 1,5-diaminonaphthalene.

The molar ratio of the charged amount of the diamine containing at least one aromatic ring with respect to the total amount of the diamine containing at least one alicyclic hydrocarbon structure and the chain aliphatic diamine is preferably 25 mol % or less. The lower limit thereof is not particularly limited but needs to exceed 0 mol %.

The molar ratio is preferably 5 mol % or more, and more preferably 10 mol % or more, from the viewpoint of enhancement of the heat resistance, and is preferably 20 mol % or less, and more preferably 15 mol % or less, from the viewpoint of maintenance of the crystallinity.

In addition, the molar ratio is preferably 12 mol % or less, more preferably 10 mol % or less, further preferably 5 mol % or less and still more preferably 0 mol % from the viewpoint of a decrease in coloration of the polyimide resin.

In the production of the polyimide resin (A), the charged amount ratio of the tetracarboxylic acid component and the diamine component is preferably from 0.9 to 1.1 mol of the diamine component per 1 mol of the tetracarboxylic acid component.

In the production of the polyimide resin (A), an end capping agent may be mixed in addition to the tetracarboxylic acid component and the diamine component. The end capping agent is preferably at least one selected from the group consisting of a monoamine compound and a dicarboxylic acid compound. It is sufficient for the amount of the end capping agent used to be an amount in which a desired amount of the end group can be introduced into the polyimide resin (A). This used amount is, based on one mole of the tetracarboxylic acid and/or derivative thereof, preferably from 0.0001 to 0.1 moles, more preferably from 0.001 to 0.06 moles, further preferably from 0.002 to 0.035 moles, still further preferably from 0.002 to 0.020 moles, and even still further preferably from 0.002 to 0.012 moles.

Among them, monoamine end capping agents are preferable as the end capping agent, and from the viewpoint of introducing the above-described chain aliphatic group having 5 to 14 carbon atoms at an end of the polyimide resin (A) to improve heat aging resistance, a monoamine that has a chain aliphatic group having 5 to 14 carbon atoms is more preferable, and a monoamine that has a saturated linear aliphatic group having 5 to 14 carbon atoms is further preferable.

The end capping agent is particularly preferably at least one selected from the group consisting of n-octylamine, isooctylamine, 2-ethylhexylamine, n-nonylamine, isononylamine, n-decylamine, and isodecylamine, further preferably at least one selected from the group consisting of n-octylamine, isooctylamine, 2-ethylhexylamine, n-nonylamine, and isononylamine, and most preferably at least one selected from the group consisting of n-octylamine, isooctylamine, and 2-ethylhexylamine.

As a polymerization method for producing the polyimide resin (A), a known polymerization method may be applied, and the method described in WO 2016/147996 can be used.

(Continuous Reinforcing Fiber (B))

Examples of the forms of the continuous reinforcing fiber (B) used in the present invention include various forms of the continuous reinforcing fiber in which monofilaments or multifilaments are arranged in one direction or alternately, fabrics such as woven fabrics, non-woven fabrics, mats, and the like. Among these, from the viewpoint of electromagnetic wave shielding performance of the obtained composite material and from the viewpoint of easily forming the continuous reinforcing fiber (B) layer, the continuous reinforcing fiber in the form of monofilaments arranged in one direction or alternately, fabric, non-woven fabric, or a mat is preferable, and in the form of fabric is more preferable.

The average fiber diameter of the monofilaments constituting the continuous reinforcing fiber (B) is preferably 1 to 100 μm, more preferably 3 to 50 μm, further preferably 4 to 20 μm, and still further preferably 5 to 10 μm. When the average fiber diameter is in this range, processing is easy, and the electromagnetic wave shielding performance, elastic modulus and strength of the obtained composite material are excellent. It is possible to measure the average fiber diameter by observation with a scanning electron microscope (SEM) or the like. The average fiber diameter of the number average can be calculated by randomly selecting 50 or more monofilaments and measuring the lengths thereof.

The fineness of the continuous reinforcing fiber (B) is preferably 20 to 4,500 tex and more preferably 50 to 4,000 tex. When the fineness is in this range, impregnation of the polyimide resin (A) is easy, and the electromagnetic wave shielding performance, elastic modulus and strength of the obtained composite material are excellent. The fineness can be calculated by determining the weight of the continuous reinforcing fiber of any length and converting into a weight per 1,000 m.

The number of filaments of the continuous reinforcing fiber (B) is usually in the range of 500 to 100,000, and from the viewpoint of the electromagnetic wave shielding performance, elastic modulus and strength of the obtained composite material, preferably 1,000 to 80,000, and more preferably 2,000 to 70,000.

Examples of the reinforcement fiber constituting the continuous reinforcing fiber (B) include inorganic fiber such as glass fiber, carbon fiber, metal fiber, boron fiber, and ceramic fiber; and organic fiber such as aramid fiber, polyoxymethylene fiber, aromatic polyamide fiber, polyparaphenylene benzo bisoxazole fiber, ultra-high molecular weight polyethylene fiber, polyimide fiber, and liquid crystal polyester (LCP) fiber. Among these, from the viewpoint of the electromagnetic wave shielding performance and strength of the obtained composite material, inorganic fiber is preferable, at least one selected from the group consisting of glass fiber and carbon fiber is more preferable, and carbon fiber is further preferable.

Examples of the carbon fiber include polyacrylonitrile-based carbon fiber and pitch-based carbon fiber. Carbon fiber made from plant-derived materials such as lignin and cellulose can also be used.

In order to improve the wettability and interface adherence with the polyimide resin (A), the continuous reinforcing fiber (B) may be surface treated with a surface treatment agent. Examples of the surface treatment agent include epoxy-based materials, urethane-based materials, acrylic materials, polyamide-based materials, polyester-based materials, vinyl ester-based materials, polyolefin-based materials, polyimide-based materials, polyetherimide-based materials, polyether ketone-based materials, and polyether-based materials. One or more of these can be used in combination. In particular, epoxy-based materials, urethane-based materials, polyimide-based materials, and polyetherimide-based materials may be suitably used.

The treatment amount of the continuous reinforcing fiber (B) with the surface treatment agent can be appropriately selected according to the type of surface treatment agent, the form of the carbon fiber, and the like.

Commercially available products can also be used as the continuous reinforcing fiber (B). Examples of commercially available products of continuous carbon fiber include Torayca Cloth "C06142", "C06151B", "C06343", "C06343B", "C06347B", "C06644B", "CK6244C", "CK6273C", "CK6261C", "UT70" series, "UM46" series, "BT70" series, "T300" series, "T300B" series, "T400HB" series, "T700SC" series, "T800SC" series, "T800HB" series, "T1000 GB" series, "M35JB" series, "M40JB" series, "M46JB" series, "M50JB" series, "M55J" series, "M55JB" series, "M60JB" series, "M30SC" series, "Z600GT" series, etc., produced by Toray Industries, Inc.; "HTA40" series, "HTS40" series, "HTS45" series, "HTS45P12" series, "STS40" series, "UTS50" series, "ITS50" series, "ITS55" series, "IMS40" series, "IMS60" series, "IMS65" series, "IMS65P12" series, "HMA35" series, "UMS40" series, "UMS45" series, "UMS55" series, "HTS40MC" series, etc., produced by Teijin Limited; and PYROFIL Cloth such as "TR3110M", "TR3523M", "TR3524M", "TR6110HM", "TR6120HM", "TRK101M", "TRK510M", "TR3160TMS", "TRK979PQRW", "TRK976PQRW", "TR6185HM", and "TRK180M", PYROFIL carbon fiber tows such as "HT" series, "IM" series, and "HM" series, and "GRAFIL" carbon fiber tows, produced by Mitsubishi Chemical Corporation.

The content ratio of the polyimide resin (A) and the continuous reinforcing fiber (B) in the composite material obtained by the present invention is not particularly limited, but from the viewpoint of the balance between electromagnetic wave shielding performance and moldability of the obtained composite material, the volume ratio of the polyimide resin (A) and the continuous reinforcing fiber (B), (A)/(B), is preferably 20/80 to 80/20, more preferably 20/80 to 70/30, and further preferably 30/70 to 60/40.

Further, the content of the continuous reinforcing fiber (B) in the fiber-reinforced composite material is, from the viewpoint of the balance between electromagnetic wave shielding performance and moldability of the obtained composite material, preferably 20 to 80% by mass, more preferably 30 to 80% by mass, and further preferably 40 to 70% by mass.

From the viewpoint of obtaining excellent electromagnetic wave shielding performance, the total content of the polyimide resin (A) and the continuous reinforcing fiber (B) in the composite material obtained by the present invention is preferably 50% by mass or more, more preferably 70% by mass or more, further preferably 80% by mass or more, still further preferably 85% by mass or more, and even still further preferably 90% by mass or more. The upper limit is 100% by mass.

The composite material obtained by the present invention may contain, from the viewpoint of imparting the desired performance, a thermoplastic resin other than the polyimide resin (A), as necessary.

Examples of the thermoplastic resin other than the polyimide resin (A) include a polyamide resin, a polyester resin, a polyimide resin other than the polyimide resin (A), a polycarbonate resin, a polyetherimide resin, a polyamide-imide resin, a polyphenylene ether imide resin, a polyphenylene sulfide resin, a polysulfone resin, a polyethersulfone resin, a polyarylate resin, a liquid crystal polymer, a polyether ketone-based resin (a polyether ether ketone resin, a polyether ketone resin, a polyether ketone ketone resin, a polyether ether ketone ketone resin, etc.), a polybenzoimidazole resin, and a fluororesin. A polyamide resin, a polyimide resin other than the polyimide resin (A), a polyether ketone-based resin, and a polybenzoimidazole resin are preferable from the viewpoint of enhancing heat resistance; a fluororesin is preferable from the viewpoint of enhancing chemical resistance; a polyetherimide resin and a polyethersulfone resin are preferable from the viewpoint of improving toughness; a liquid crystal polymer is preferable from the viewpoint of low water absorption; a polyphenylene sulfide resin is preferable from the viewpoint of improving flame resistance; and a polyamide resin and a polycarbonate resin are preferable from the viewpoint of adjusting moldability.

These thermoplastic resins may be laminated as a thermoplastic resin layer other than the polyimide resin (A) layer and may also be contained in the polyimide resin (A) layer in a compatible or incompatible state to the extent that the effects of the present invention are not inhibited.

When the thermoplastic resin other than the polyimide resin (A) is contained, the content thereof is not particularly limited as long as the effects of the present invention are not inhibited.

Further, the composite material obtained by the present invention may contain additives such as a filler, a deluster-ant, a nucleating agent, a plasticizer, an antistatic agent, an anti-coloring agent, an anti-gelling agent, a colorant, a slidability improver, a conducting agent, a flame retardant, a resin-modifying agent, a powdery or particulate metal magnetic article, and fine powder as an impact-improving agent, as necessary.

Among the above, examples of the fine powder as the impact-improving agent include organic powders such as a polyimide resin powder composed of the component (A), a polyimide resin powder other than the component (A), a polyetherimide resin powder, a polyethersulfone resin powder, a reactive polyethersulfone resin powder, a polyphenylene sulfide powder, and a polyether ketone-based rein powder. The average particle size of the fine powder is not particularly limited, and is preferably 0.1 to 200 μm, more preferably 1 to 100 μm, and further preferably 2 to 50 μm. The fine powder may have particles held or melted after process by molding.

The plasticizer preferably have high heat resistance, and examples thereof include silicone-based plasticizers such as "GENIOPLAST Pellet S" produced by Wacker Asahikasei Silicone Co., Ltd.; and polyol fatty acid esters such as pentaerythritol tetrastearate (e.g., "LOXIOL VPG861", produced by Emery Oleochemicals).

The content of the additive is not particularly limited, but from the viewpoint of maintaining excellent electromagnetic wave shielding performance, the content in the composite material is usually 30% by mass or less, preferably 0.0001 to 25% by mass, more preferably 0.001 to 20% by mass, and further preferably 0.01 to 20% by mass.

The shape of the composite material obtained by the present invention is not particularly limited if the shape can be produced by heat and pressure molding, and can be appropriately selected depending on the shape of the used portion of the composite material. From the viewpoint of producing the composite material by heat and pressure molding and from the viewpoint of using it as an electromagnetic wave shielding material, the composite material is preferably flat and may also be curved, hat-shaped with a convex part near the center of the flat plate, or the like.

The thickness of the composite material is, from the viewpoint of obtaining excellent electromagnetic wave shielding performance, preferably 0.5 mm or more, more preferably 1 mm or more, and further preferably 1.5 mm or more. Since the composite material obtained by the present invention exhibits better flame resistance as the thickness increases, the thickness is still further preferably 2 mm or more and even still further preferably 2.5 mm or more from the viewpoint of improving flame resistance. Further, from the viewpoint of easiness of production, the thickness is preferably 200 mm or less, more preferably 150 mm or less, and further preferably 100 mm or less. The thickness of the composite material means the length of each layer in the lamination direction in the composite material.

In addition, both surfaces of the composite material are preferably composed of the polyimide resin (A) layer. This is because it is easier to uniformly impregnate the continuous reinforcing fiber (B) with the polyimide resin (A) when the heat and pressure molding is performed in the step (II). Further, since the polyimide resin (A) used for the composite material has a relatively small crystal size, color unevenness which can occur with a general crystalline resin (white turbidity of the crystal part) is less likely to occur, and therefore both surfaces of the composite material are preferably composed of the polyimide resin (A) layer even if the surfaces of the composite material are covered with the resin. In addition, this is because it is possible to suppress electric corrosion generated between carbon fibers and enhance chemical resistance by disposing the polyimide resin (A) on the both surfaces of the composite material.

The both surfaces of the composite material are an upper surface and a lower surface substantially perpendicular to the lamination direction of each layer.

Further, in order to impart any properties such as conductivity, high rigidity, and gas barrier properties to the surface of the composite material, a metal sheet, a film composed of a polyimide resin other than the component (A), a liquid crystal polyester (LCP) film, and the like may be pressed to both surfaces or one surface of the composite material.

<Step (I)>

In the production method of the present invention, in step (I), at least one polyimide resin (A) layer (hereinafter, also simply referred to as "(A) layer") and at least one continuous reinforcing fiber (B) layer (hereinafter, also simply referred to as "(B) layer") are laminated to obtain a laminated product. The polyimide resin (A) is impregnated in the continuous reinforcing fiber (B) by subjecting the laminated product to step (II) described later and carrying out heat and pressure molding to produce a composite material.

Examples of a method of laminating at least one (A) layer and at least one (B) layer in the step (I) include a method of laminating a (A) layer to a (B) layer by using the polyimide resin (A) which has been processed by molding into a shape such as a film or a fiber in advance; and a method of directly laminating the (A) layer onto the (B) layer while melting and extruding the (A) layer into a shape such as a film and a fiber. The former enables precise lamination at room temperature, and the latter enables significant shortening of the production step.

The polyimide resin (A) layer used in the step (I) is preferably a layer composed of a film or fibers of the polyimide resin (A) and more preferably a layer composed of a film of the polyimide resin (A), from the viewpoint of obtaining excellent electromagnetic wave shielding performance by uniformly impregnating the continuous reinforcing fiber (B) layer and from the viewpoint of handleability. Although molding with a powdery polyimide resin (A) is also possible, the powder has a larger specific surface area than a film or a fiber, and thus there is a concern that the powder is easily oxidized and deteriorated during heat and pressure molding to thereby result in a decrease in strength. In order to avoid oxidative deterioration, molding in a vacuum state or in an inert gas atmosphere is required, and therefore there is a great limitation in practice. In addition, it is not easy to uniformly disperse the powdery polyimide resin (A) in the continuous reinforcing fiber (B), and if the heat and pressure molding is performed while the dispersion is non-uniform, voids are generated and local physical properties are deteriorated. In contrast to this, a film or fiber, especially a film, is suitable since the polyimide resin (A) can be easily and uniformly disposed.

The film or fiber of the polyimide resin (A) can be produced by a known method. Examples of the method for producing the film of the polyimide resin (A) include a method of continuously molding the film by producing polyimide resin (A) pellets and then extruding the pellets from an extruder; and a method of molding powder or pellets of the polyimide resin (A) by a heat pressing machine. Examples of the method for producing the fiber of the polyimide resin (A) include a method for producing the fiber from the polyimide resin (A) pellets by melt spinning.

When the additive described above is contained in the composite material, the additive is preferably contained in the polyimide resin (A) layer from the viewpoint of handleability and from the viewpoint of uniformly dispersing the additive.

When the polyimide resin (A) used in the step (I) is a film, the thickness of the film is preferably 20 to 500 μm, more preferably 40 to 300 μm, and further preferably 50 to 200 μm from the viewpoint of easiness of production, handleability, and impregnation properties into the continuous reinforcing fiber (B) layer. When the polyimide resin (A) layer used in the step (I) is composed of polyimide resin fibers, the average fiber length of the resin fibers is preferably 1 to 20 mm and more preferably 1 to 15 mm from the viewpoint of impregnation properties. Further, when the polyimide resin (A) layer is composed of the polyimide resin fibers, the polyimide resin (A) layer is usually produced using a thermoplastic resin fiber bundle (multifilament) in which the fibers are bundled, and the total fineness per fiber bundle is preferably 37 to 600 D, and the number of fibers constituting the fiber bundle is preferably 1 to 200 f.

As the continuous reinforcing fiber (B) layer used in the step (I), the continuous reinforcing fiber can be used in the form of monofilaments arranged in one direction or alternately (e.g., UD material), fabric, non-woven fabric, a mat, or the like, as described above. Among these, the form of the fabric is preferable from the viewpoint of obtaining excellent electromagnetic wave shielding performance and from the viewpoint of handleability.

The thickness of the continuous reinforcing fiber (B) layer used in the step (I) is preferably 0.1 to 1 mm and more preferably 0.15 to 0.8 mm from the viewpoint of obtaining excellent electromagnetic wave shielding performance and from the viewpoint of impregnation properties of the polyimide resin (A).

The lamination number of the polyimide resin (A) layer and the continuous reinforcing fiber (B) layer is not particularly limited, but from the viewpoint of obtaining excellent electromagnetic wave shielding performance and from the viewpoint of productivity, the number of the (A) layer is preferably 1 to 500, more preferably 3 to 200, and further preferably 5 to 100, and the number of the (B) layer is preferably 1 to 500, more preferably 2 to 200, and further preferably 4 to 100.

The total lamination number of the polyimide resin (A) layer and the continuous reinforcing fiber (B) layer can be appropriately selected so that the composite material has a desired thickness, but from the viewpoint of obtaining excellent electromagnetic wave shielding performance and from the viewpoint of productivity, the total lamination number is preferably 2 to 1,000, more preferably 5 to 400, and further preferably 9 to 200.

In the step (I), other layers besides the polyimide resin (A) layer and the continuous reinforcing fiber (B) layer may be further laminated to the extent that the effects of the present invention are not impaired. Examples of such other layers include a thermoplastic resin layer other than the polyimide resin (A) layer, an adhesive layer, and a metal layer. From the viewpoint of obtaining excellent electromagnetic wave shielding performance and from the viewpoint of moldability, the laminated product obtained in the step (I) is preferably composed only of the polyimide resin (A) layer and the continuous reinforcing fiber (B) layer.

When two or more polyimide resin (A) layers or continuous reinforcing fiber (B) layers are laminated, the order of lamination is not particularly limited, but from the viewpoint of obtaining uniform and excellent electromagnetic wave shielding performance in the composite material, it is preferable to alternately laminate the (A) layers and the (B) layers.

Aspects of alternately laminating the (A) and (B) layers includes an aspect of alternately laminating the layers (A) and (B) one by one, such as the layers (A)-(B)-(A), as well as an aspect of alternately laminating two or more layers of the same layer and another layer, such as the layers (A)-(A)-(B)-(A)-(A).

In addition, from the viewpoint of uniformly impregnating the continuous reinforcing fiber (B) with the polyimide resin (A) when the heat and pressure molding is performed in the step (II), the uppermost layer and the lowermost layer of the laminated product are preferably the polyimide resin (A) layers.

On the other hand, when the polyimide resin fiber is used in the formation of the polyimide resin (A) layer, the contents of JP 2014-224333 A can also be taken into consideration.

<Step (II)>

In the step (II), the laminated product obtained in the step (I) is molded by heating and pressurizing under a condition where a working parameter X expressed by the following expression (i) is 35 or more and 87 or less. Since the method of the present invention include the step (II), a composite material having excellent electromagnetic wave shielding performance can be produced by the working mechanism.

$$X=(Tp-Tm)^3 \times P^{1/2}/1000 \quad \text{(i)}$$

wherein in the expression (i), Tp represents a temperature (° C.) during the molding, Tm represents a melting point (° C.) of the polyimide resin (A), and P represents a press pressure (MPa) during the molding.

In the expression (i), the Tp−Tm is preferably 15° C. or higher, more preferably 20° C. or higher, further preferably 25° C. or higher, and still further preferably 30° C. or higher from the viewpoint of obtaining a composite material having excellent electromagnetic wave shielding performance by sufficiently impregnating the continuous reinforcing fiber (B) with the polyimide resin (A). Further, from the viewpoint of suppressing the outflow of the polyimide resin (A) to the outside of the system in the heat and pressure molding, the Tp−Tm is preferably 80° C. or lower, more preferably 60° C. or lower, further preferably 50° C. or lower, and still further preferably 40° C. or lower.

In the expression (i), the press pressure P during the molding is preferably 0.1 MPa or more, more preferably 0.5 MPa or more, further preferably 1.0 MPa or more, and still further preferably 2.0 MPa or more from the viewpoint of obtaining a composite material having excellent electromagnetic wave shielding performance by sufficiently impregnating the continuous reinforcing fiber (B) with the polyimide resin (A). Further, from the viewpoint of suppressing the outflow of the polyimide resin (A) to the outside of the system in the heat and pressure molding, the press pressure P during the molding is preferably 50 MPa or less, more preferably 30 MPa or less, further preferably 20 MPa or less, and still further preferably 10 MPa or less.

The value of the working parameter X expressed by the expression (i) is 35 or more, preferably 40 or more, more preferably 50 or more, and further preferably 55 or more from the viewpoint of obtaining a composite material having excellent electromagnetic wave shielding performance by sufficiently impregnating the continuous reinforcing fiber (B) with the polyimide resin (A). Further, from the viewpoint of suppressing the outflow of the polyimide resin (A) to the outside of the system in the heat and pressure molding, the value of X is 87 or less, preferably 85 or less, more preferably 80 or less, and further preferably 75 or less.

The heat and pressure molding in the step (II) can be performed by a known method using a heat pressing apparatus, a vacuum heat pressing apparatus, a pressure roll, a double belt press, or the like. From the viewpoint of controlling the press pressure P during the molding, it is preferable to use a heat pressing apparatus.

The resin outflow rate in the heat and pressure molding of the step (II) is preferably 1.0 to 5.0% and more preferably 1.0 to 4.0%. When the resin outflow rate is in the above range, it is easy to sufficiently impregnate the continuous reinforcing fiber (B) with the polyimide resin (A), whereby excellent electromagnetic wave shielding performance is easily obtained. The resin outflow rate is a value calculated from the following equation.

Resin outflow rate (%)={(mass (g) of laminated product obtained in step (I))−(mass (g) of composite material obtained)}÷(mass (g) of resin used in step (I))×100

The method of the present invention may include the steps (I) and (II) in this order, and may also include other steps.

In the present invention, it is preferable to perform a step of removing the excess thermoplastic resin flowing out of the system by cutting or the like after the step (II).

As another step, a step of pressing a metal sheet, a film composed of a polyimide resin other than the component (A), a liquid crystal polyester (LCP) film, and the like to both surfaces or one surface of the composite material may be performed between the steps (I) and (II) or after the step (II). Heat treatment may be further performed after step (II) to improve the dimensional stability of the composite material.

Further, it is possible to perform a step of coating the surface of the composite with a shielding paint to impart additional shielding properties; a step of cutting fine grooves on the surface of the composite material by laser, physical polishing, pressing, or the like to join other resins together by insert molding or the like; a step of joining the composite material by heating and pressing to a metal, alloy, or thermosetting resin in which fine grooves are cut by laser, physical polishing, pressing, or the like; and the like, for example, after the step (II).

The fiber-reinforced composite material obtained by the method of the present invention is suitable as an electromagnetic wave shielding material because it has excellent electromagnetic wave shielding performance. Other examples of the composite material include various modules such as instrument panels, door beams, undercovers, lamp housings, pedal housings, radiator supports, spare tire covers, and front ends; automotive components such as cylinder head covers, bearing retainers, intake manifolds, and pedals; bicycle housing members; special vehicle members such as trucks, trailers, dump trucks, and caterpillar drive vehicles; aircraft-related parts such as landing gear pods, winglets, spoilers, edges, ladders, fairings, and ribs; tools such as monkey wrenches and wrenches; industrial piping; oil-cutting piping and members; parts of home and office electrical appliances such as telephones, facsimiles, VTRs, copying machines, clocks, televisions, microwave ovens, sound equipment, speaker diaphragms, toiletries, laser discs (registered trademark), refrigerators, and air conditioners. It can also be applied to housings for personal computers and cellular phones; members for electric and electronic equipment, charger covers, battery AC adapter cases, condenser cases, power meters, door parts and other large automotive exterior molded parts such as chassis/frames, body parts, drivetrain parts, interior parts, exterior parts, functional parts, and other parts.

EXAMPLES

The present invention will be described in more detail with reference to examples below, but the present invention is not limited thereto. Further, various measurements and evaluations in Production Examples and Examples were carried out in the following manner.

<Infrared Spectroscopy (IR Measurement)>

The IR measurement of the polyimide resin was performed with "JIR-WINSPEC 50", produced by JEOL, Ltd.

<Logarithmic Viscosity μ>

The polyimide resin was dried at from 190 to 200° C. for 2 hours, and then 0.100 g of the polyimide resin was dissolved in 20 mL of concentrated sulfuric acid (96%, produced by Kanto Chemical Co., Inc.) to form a polyimide resin solution, and the measurement was made at 30° C. with a Cannon-Fenske viscometer using the polyimide resin solution as a measurement sample. The logarithmic viscosity p was obtained according to the following expression.

$$\mu = \ln(t_s/t_0)/C$$

$t_0$: elapsed time for flowing concentrated sulfuric acid
$t_s$: elapsed time for flowing polyimide resin solution
C: 0.5 g/dL <Melting Point, Glass Transition Temperature, Crystallization Temperature, and Exothermic Amount of Crystallization>

The melting point Tm, glass transition temperature Tg, crystallization temperature Tc, and the exothermic amount of crystallization ΔHm of the thermoplastic resin were measured with a differential scanning calorimeter ("DSC-6220", produced by SII Nanotechnology, Inc.).

In a nitrogen atmosphere, a thermal history of the following conditions was imposed on the samples. The condition of the thermal history included the first heating (heating rate: 10° C./min), then cooling (cooling rate: 20° C./min), and then second heating (heating rate: 10° C./min). The heating temperature was from room temperature to 400° C.

The melting point Tm was determined by reading the peak top value of the endothermic peak observed in the second heating. The glass transition temperature (Tg) was determined by reading the value observed in the second heating. The crystallization temperature (Tc) was determined by reading the peak top value of the exothermic peak observed in cooling.

The exothermic amount of crystallization ΔHm (mJ/mg) was calculated from the area of the exothermic peak observed in cooling.

<Crystallization Half-Time>

The crystallization half-time of the polyimide resin was measured with a differential scanning calorimeter ("DSC-6220", produced by SII Nanotechnology, Inc.).

The polyimide resin was held at 420° C. for 10 minutes in a nitrogen atmosphere so as to completely melt, then quenched at a cooling rate of 70° C./min, and the time required from the appearance of the observed crystallization peak to the peak top thereof was calculated. In Table 1, cases where the crystallization half-time was 20 seconds or less are indicated as "[1]<20".

<Weight Average Molecular Weight>

The weight average molecular weight (Mw) of the polyimide resin was measured with a gel permeation chromatography (GPC) measurement apparatus "Shodex GPC-101" produced by Showa Denko K.K. under the following conditions:

Column: Shodex HFIP-806M
Mobile phase solvent: HFIP containing 2 mM sodium trifluoroacetate
Column temperature: 40° C.
Flow rate of mobile phase: 1.0 mL/min
Specimen concentration: about 0.1 mass %
Detector: IR detector
Amount of injection: 100 μm
Calibration curve: standard PMMA <Thickness Measurement>

The thickness of the composite material and the member used for its preparation were measured using a micrometer ("Mitsutoyo ABSOLUTE 547-401", produced by Mitutoyo Corporation).

<Resin Outflow Rate>

The resin outflow rate in the composite material preparation of each example was calculated from the following expression.

Resin outflow rate (%) {(mass (g) of laminated product obtained in step (I))−(mass (g) of composite material obtained)}÷(mass (g) of resin used in step (I))×100

<Presence or Absence of Void>

A cross section of the composite material obtained by preparation in each example and then cutting was observed using a digital microscope ("VHX-6000", produced by Keyence Corporation) at a magnification of 500 times, and the presence or absence of voids was evaluated according to the following criteria.

A: The resin component is sufficiently impregnated in the gap between the carbon fibers, and voids (black shadows) are not observed.

B: The resin component is impregnated in the gap between the carbon fibers, but voids are partially observed.

C: Voids are observed in most of the gap between the carbon fibers.

<Electromagnetic Wave Shielding Performance>

The flat fiber-reinforced composite material of 328 mm×328 mm prepared in each example was processed by cutting to 300 mm×300 mm. Using this composite material, the shielding performance (dB) of electric and magnetic fields was measured by the KEC method based on the standard of Institute of Electrical and Electronics Engineers IEEE-Std-299 under the following conditions.

(Measurement Condition)

Apparatus used: shielding material permeation loss measurement system "JSE-KEC", produced by TOYO Corporation (shielding material evaluation measurement apparatus developed by General Incorporated Association KEC Electronic Industry Development Center, etc.)

Measurement atmosphere: 23° C., 50% R.H.

Measurement frequency: 1 to 1,000 MHz

The shielding performance (dB) is calculated from the following expression, and the greater value means higher shielding performance.

Shield performance (dB)=20×log ({electric field (or magnetic field) strength with composite material}/{electric field (or magnetic field) strength without composite material})

The "average shielding performance" shown in Table 3 is the average value of the shielding performance (dB) at a measurement frequency of 1 to 1,000 MHz.

Production Example 1 (Production of Polyimide Resin 1)

500 g of 2-(2-methoxyethoxy)ethanol (produced by Nippon Nyukazai Co., Ltd.) and 218.12 g (1.00 mol) of pyromellitic dianhydride (produced by Mitsubishi Gas Chemical Company, Inc.) were introduced in a 2 L separable flask equipped with a Dean-Stark apparatus, a Liebig condenser tube, a thermocouple, and a four-paddle blade. After creation of a nitrogen flow, the mixture was agitated at 150 rpm so as to become a homogeneous suspended solution. On the other hand, 49.79 g (0.35 mol) of 1,3-bis(aminomethyl)cyclohexane (produced by Mitsubishi Gas Chemical Company, Inc., cis/trans ratio=7/3) and 93.77 g (0.65 mol) of 1,8-octamethylenediamine (produced by Kanto Chemical Co., Inc.) were dissolved in 250 g of 2-(2-methoxyethoxy)ethanol with a 500 mL beaker, thereby preparing a mixed diamine solution. This mixed diamine solution was added into the suspended solution gradually with a plunger pump. Heat was generated due to the drop addition, but the internal temperature was adjusted to be within the range of 40 to 80° C. The dropwise addition of the mixed diamine solution was carried out in a nitrogen flow state over the whole period. The number of rotations of the agitation blade was set to 250 rpm. After the completion of the dropwise addition, 130 g of 2-(2-methoxyethoxy)ethanol and 1.284 g (0.010 mol) of n-octylamine (produced by Kanto Chemical Co., Inc.) as an end capping agent were added thereto, and the mixture was further agitated. At this stage, a pale yellow polyamic acid solution was obtained. Next, the agitation speed was set to 200 rpm, and the polyamic acid solution in the 2 L separable flask was then heated to 190° C. In this heating process, the deposition of a polyimide resin powder and dehydration associated with imidization were confirmed at a solution temperature of from 120 to 140° C. The solution was kept at 190° C. for 30 minutes, then allowed to cool to room temperature, and filtered. The obtained polyimide resin powder was washed with 300 g of 2-(2-methoxyethoxy)ethanol and 300 g of methanol, filtered, and then dried at 90° C. for 10 hours with a vacuum drier to obtain 317 g of a powder of polyimide resin 1.

The measurement of the IR spectrum of polyimide resin 1 showed the characteristic absorption of an imide ring $\nu$(C=O) observed at 1768 and 1697 (cm$^{-1}$). The logarithmic viscosity was 1.30 dL/g, Tm was 323° C., Tg was 184° C., Tc was 266° C., the exothermic amount of crystallization was 21.0 mJ/mg, the crystallization half-time was 20 seconds or less, and Mw was 55,000.

Table 1 shows the composition and evaluation results of the polyimide resin of Production Example 1. The values expressed in mol % of the tetracarboxylic acid component and the diamine component in Table 1 are values calculated from the charged amount of each component in production of the polyimide resin.

TABLE 1

| | | Tetracarboxylic acid component (mol % in total tetracarboxylic acid component) | Diamine component (mol % in total diamine component) | | (1)/{(1) + (2)} | Tm | Tg | Tc | Exothermic amount of crystallization ΔHm | Half crystallization time | |
|---|---|---|---|---|---|---|---|---|---|---|---|
| | | PMDA | 1,3-BAC | OMDA | (mol %)*1 | (° C.) | (° C.) | (° C.) | (mJ/mg) | (seconds) | Mw |
| Production Example 1 | Polyimide resin 1 | 100 | 35 | 65 | 35 | 323 | 184 | 266 | 21.0 | <20 | 55,000 |

*1 Content ratio (mol %) of repeating structural unit of formula (1) with respect to total of repeating structural unit of formula (1) and repeating structural unit of formula (2) in polyimide resin 1

The abbreviations in the table are as follows.
PMDA; pyromellitic dianhydride
1,3-BAC; 1,3-bis(aminomethyl)cyclohexane
OMDA; 1,8-octamethylenediamine Examples 1-1 to 1-3 (Production and Evaluation of Carbon Fiber-Reinforced Composite Material)

<Preparation of Polyimide Resin Film>

The powder of the polyimide resin 1 obtained in Production Example 1 was extruded at a barrel temperature of 250 to 330° C. and a screw rotation speed of 100 rpm using a twin-screw kneading extruder "TEM58SX" (produced by Shibaura Machine Co., Ltd.). A strand extruded from the extruder was cooled in air and then pelletized with a pelletizer ("Fan Cutter fcwn30-12", produced by Hoshi Plastic Co., Ltd.).

The obtained pellets were dried in a hot air dryer heated to 160° C. for 12 hours, then set in a single-screw extrusion molding machine having a diameter of 40 mm equipped with a T-die having a width of 900 mm, and melt-kneaded. At this time, the temperature of the single-screw extruder was set to 340 to 355° C., and the temperature of the T-die was set to 355° C. The melt-kneaded polyimide resin 1 was continuously extruded from the T-die of the single-screw extrusion molding machine, cooled by a cooling roll heated to 150° C., and then sequentially wound around a winding pipe of a winding machine to produce a film having a length of 100 m, a width of 650 mm, and a thickness of 0.05 mm. The film was cut with a cutter to prepare a film of 328 mm×328 mm×0.05 mm in thickness composed of the polyimide resin 1.

<Preparation of Composite Material>

The polyimide resin film was placed in a stack of 2 sheets, and a carbon fiber fabric ("C06343", produced by Toray Industries, Inc., T300 plain weave cloth, number of filaments in the warp and weft: 3 K, fabric weight: 198 g/m², 0.25 mm in thickness, 4ply) cut into 328 mm×328 mm was laminated on the film. Two polyimide resin films and one carbon fiber fabric were alternately laminated thereon, and finally two polyimide resin films were laminated to obtain a laminated product in which a total of 20 polyimide resin films and a total of 9 carbon fiber fabrics were laminated (step (I)).

This laminated product was molded by heating and pressurizing with a heat pressing apparatus (produced by Kodaira Seisakusho Co., Ltd.) under conditions of a pressing machine temperature (Tp) of 355° C., a press pressure (P) of 3 MPa, and a press time of 900 seconds (step (II)). After cooling, the ends containing burrs were cut with a diamond cutter to prepare a flat fiber-reinforced composite material of 300 mm×300 mm×thickness 2 mm having both surfaces composed of the polyimide resin 1.

The various evaluations described above were carried out using this composite material. The results are shown in Table 2. Examples 1-1 to 1-3 shown in Table 2 show the evaluation results of five composite materials prepared under the same conditions, each with median, minimum, and maximum resin outflow rates. In addition, the shielding performance was evaluated by the method above using the flat composite material prepared in Example 1-1. The results are shown in Table 3.

Examples 2 to 3 and Comparative Examples 1 to 3

A flat composite material was prepared by the same method as in Example 1 except that the lamination number of the polyimide resin film and the carbon fiber fabric and the molding conditions in Examples 1-1 to 1-3 were changed as listed in Table 2, and the various evaluations described above were carried out. The results are shown in Table 2. For the resin outflow rate in Examples 2 and 3, the average value of n=3 is shown. The shielding performance was evaluated by the method above using the flat composite material prepared in Comparative Example 1. The results are shown in Table 3.

Comparative Example 4

A composite material was prepared by the same method as in Example 1 except that a polyether ether ketone resin (PEEK resin) film ("Shin-Etsu Sepla Film", produced by Shin-Etsu Polymer Co., Ltd., 328 mm×328 mm×0.05 mm in thickness, PEEK melting point: 343° C., Tg: 143° C.) was used instead of a polyimide resin film and the pressing machine temperature (Tp) was changed to 380° C. in Example 1, and the various evaluations were carried out. The results are shown in Table 2. The shielding performance was evaluated by the method above using the flat composite material prepared in Comparative Example 4. The results are shown in Table 3.

Example 4

A film of 350 mm×145 mm×0.05 mm in thickness composed of the polyimide resin 1 was prepared by the same method as described in Examples 1-1 to 1-3.

This polyimide resin film was placed in a stack of 2 sheets, and a carbon fiber fabric ("C06343", produced by Toray Industries, Inc., T300 plain weave cloth, number of filaments in the warp and weft: 3 K, fabric weight: 198 g/m², 0.25 mm in thickness, 4ply) cut into 350 mm×145 mm was laminated on the film. One polyimide resin film and one carbon fiber fabric were alternately laminated thereon, and finally two polyimide resin films were laminated to obtain a laminated product in which a total of 12 polyimide resin films and a total of 9 carbon fiber fabrics were laminated (step (I)).

This laminated product was molded by heating and pressurizing with a hat-shaped mold in a heat pressing apparatus (produced by Kodaira Seisakusho Co., Ltd.) under conditions of a pressing machine temperature (Tp) of 355° C., a press pressure (P) of 5 MPa, and a press time of 900 seconds (step (II)). After cooling, the ends containing burrs were cut with a diamond cutter to obtain a hat fiber-reinforced composite material 100 having both surfaces composed of the polyimide resin 1. The various evaluations described above were carried out using the obtained composite material 100. The results are shown in Table 2.

Figure 1:
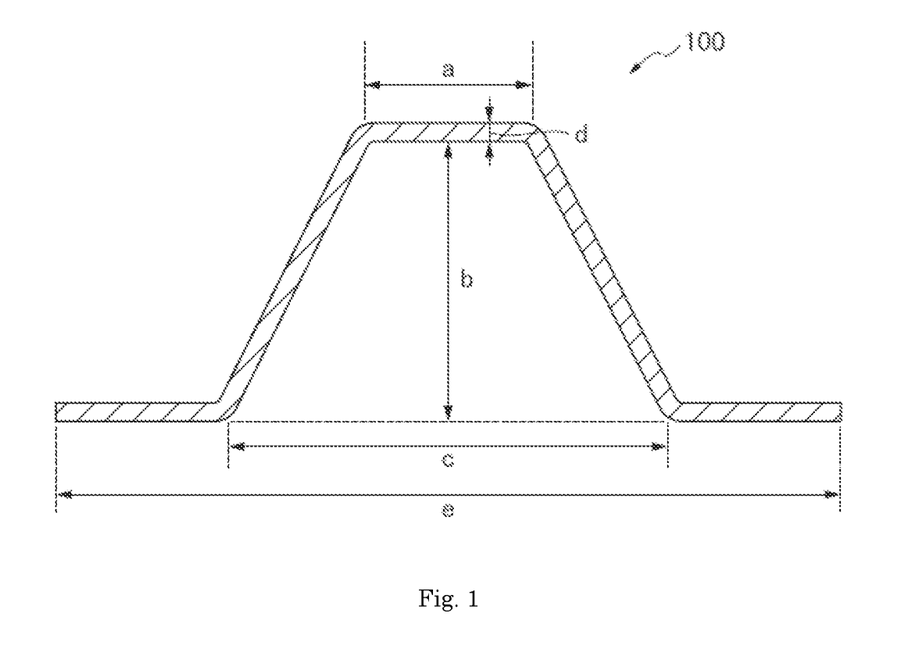
FIG. 1 is a schematic cross-sectional view of a hat fiber-reinforced composite material prepared in Example 4.
Figure 2:
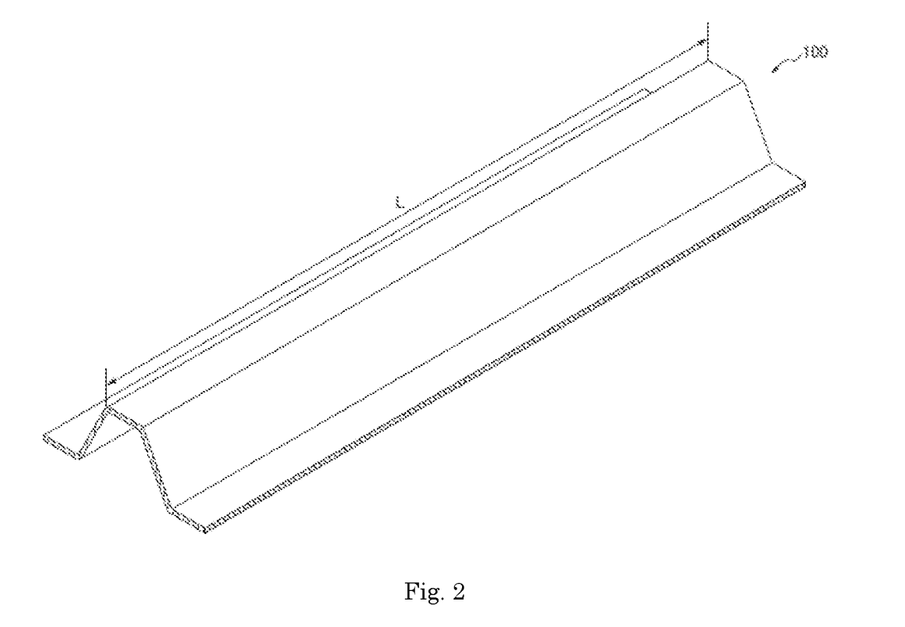
FIG. 2 is a perspective view of the hat fiber-reinforced composite material prepared in Example 4.

FIG. 1 is a schematic cross-sectional view illustrating the shape of the hat fiber-reinforced composite material 100 obtained in Example 4, and FIG. 2 is a perspective view thereof. In FIG. 1, a is 15 mm, b is 25 mm, c is 40 mm, and e is 70 mm, and in FIG. 2, L is 300 mm. The thickness d of the composite material is shown in Table 1.

Reference Example 1

Using the polyimide resin film of 328 mm×328 mm×0.1 mm in thickness prepared in Example 1, the shielding performance was evaluated by the method above. The results are shown in Table 3.

TABLE 2

| | Thermoplastic resin layer | | | Carbon fiber layer | | Composite | | Molding conditions | | | | Resin outflow rate (%) | Presence or absence of void |
| --- | --- | --- | --- | --- | --- | --- | --- | --- | --- | --- | --- | --- | --- |
| | Thermoplastic resin | Tm (° C.) | Lamination number | Type | Lamination number | Shape | Thickness (mm) | Tp (° C.) | Tp − Tm (° C.) | P (MPa) | X | | |
| Example 1-1 | Polyimide resin 1 | 323 | 20 | 3K plain weave | 9 | Flat | 2 | 355 | 32 | 3 | 56.8 | 2.6 | A |
| Example 1-2 | Polyimide resin 1 | 323 | 20 | 3K plain weave | 9 | Flat | 2 | 355 | 32 | 3 | 56.8 | 1.7 | A |
| Example 1-3 | Polyimide resin 1 | 323 | 20 | 3K plain weave | 9 | Flat | 2 | 355 | 32 | 3 | 56.8 | 3.4 | A |
| Example 2 | Polyimide resin 1 | 323 | 30 | 3K plain weave | 14 | Flat | 3 | 355 | 32 | 3 | 56.8 | 1.0 | A |
| Example 3 | Polyimide resin 1 | 323 | 38 | 3K plain weave | 18 | Flat | 4 | 355 | 32 | 3 | 56.8 | 1.2 | A |
| Comparative Example 1 | Polyimide resin 1 | 323 | 20 | 3K plain weave | 9 | Flat | 2 | 340 | 17 | 3 | 8.5 | 0.45 | C |
| Comparative Example 2 | Polyimide resin 1 | 323 | 20 | 3K plain weave | 9 | Flat | 2 | 345 | 22 | 3 | 18.4 | 0.83 | C |
| Comparative Example 3 | Polyimide resin 1 | 323 | 20 | 3K plain weave | 9 | Flat | 2 | 350 | 27 | 3 | 34.1 | 0.30 | B |
| Comparative Example 4 | PEEK | 343 | 20 | 3K plain weave | 9 | Flat | 2 | 380 | 37 | 3 | 87.7 | 1.6 | B |
| Example 4 | Polyimide resin 1 | 323 | 12 | 3K plain weave | 9 | Hat | 1.65 | 355 | 32 | 5 | 73.3 | 2.1 | A |

TABLE 3

| | Measurement frequency | Example 1-1 | Comparative Example 1 | Comparative Example 4 | Reference Example 1 |
| --- | --- | --- | --- | --- | --- |
| Shielding performance/dB (electric field) | 1 MHz | 81 | 64 | 70 | 0 |
| | 10 MHz | 93 | 61 | 60 | 0 |
| | 100 MHz | 78 | 72 | 73 | 0 |
| | 1000 MHz | 62 | 66 | 58 | 0 |
| | Average shielding performance (1-1000 MHZ) | 80 | 67 | 63 | 0 |
| Shielding performance/dB (magnetic field) | 1 MHz | 4 | 4 | 4 | 0 |
| | 10 MHz | 19 | 19 | 19 | 0 |
| | 100 MHz | 59 | 57 | 57 | 0 |
| | 1000 MHz | 62 | 58 | 63 | 0 |
| | Average shielding performance (1-1000 MHz) | 31 | 30 | 30 | 0 |

As shown in Table 3, it can be seen that the fiber-reinforced composite material of Example 1-1 had higher electric field shielding performance especially in the low frequency region (100 MHz or less) when compared to the composite material of Comparative Example 1 using the same polyimide resin and continuous carbon fiber and differing only in production conditions and that of Comparative Example 4 using a PEEK resin instead of the polyimide resin (A).

As shown in Reference Example 1, it was confirmed that the polyimide resin (A) layer alone did not provide sufficient shielding performance.

INDUSTRIAL APPLICABILITY

According to the present invention, the method for producing a fiber-reinforced composite material can be provided that contains a thermoplastic resin and a continuous reinforcing fiber and has excellent electromagnetic wave shielding performance.

REFERENCE SIGNS LIST

100 Hat fiber-reinforced composite material

The invention claimed is:
1. A method for producing a fiber-reinforced composite material comprising a polyimide resin (A) and a continuous reinforcing fiber (B), wherein
the polyimide resin (A) comprises a repeating structural unit represented by the following formula (1) and a repeating structural unit represented by the following formula (2), and
a content ratio of the repeating structural unit of the formula (1) with respect to the total of the repeating structural unit of the formula (1) and the repeating structural unit of the formula (2) is from 20 mol % to less than 40 mol %:

(1)

(2)

wherein R1 represents a divalent group having from 6 to 22 carbon atoms comprising at least one alicyclic hydrocarbon structure; R2 represents a divalent chain aliphatic group having from 5 to 16 carbon atoms; and $X_1$ and $X_2$ each independently represent a tetravalent group having from 6 to 22 carbon atoms comprising at least one aromatic ring, the method comprising the following (I) and (II) in that order:

(I) laminating at least one polyimide resin (A) layer and at least one continuous reinforcing fiber (B) layer to obtain a laminated product; and (II) molding the laminated product by heating and pressurizing under a condition where a working parameter X expressed by the following expression (1) is from 56.8 to 73.3:

$$X=(Tp-Tm)^3 \times P^{1/2}/1000 \qquad (i),$$

wherein Tp represents a temperature (° C.) during the molding, Tm represents a melting point (° C.) of the polyimide resin (A), and P represents a press pressure (MPa) during the molding, and wherein Tp−Tm in the expression (i) is from 25° C. to 40° C., wherein a resin outflow rate in heat and pressure molding in (II) is from 1.0% to 5.0%, wherein the polyimide resin (A) layer used in (I) is a layer composed of a film or fibers of the polyimide resin (A), wherein, when the polyimide resin (A) layer is the film, a thickness of the film is from 20 to 500 μm, and wherein, when the polyimide resin (A) layer is composed of the fibers of the polyimide resin (A), the polyimide resin (A) layer is produced by using a thermoplastic resin fiber bundle in which the fibers are bundled, and the total fineness per fiber bundle is from 37 to 600 D.

2. The method of claim 1, wherein a reinforcement fiber constituting the continuous reinforcing fiber (B) is carbon fiber.

3. The method of claim 1, wherein a content of the continuous reinforcing fiber (B) in the fiber-reinforced composite material is from 20% to 80% by mass.

4. The method of claim 1, wherein a lamination number of the polyimide resin (A) layer is from 3 to 200, and a lamination number of the continuous reinforcing fiber (B) layer is from 2 to 200.

5. The method of claim 1, wherein a total lamination number of the polyimide resin (A) layer and the continuous reinforcing fiber (B) layer is from 9 to 200.

6. The method of claim 1, wherein a thickness of the fiber-reinforced composite material is from 0.5 mm to 200 mm.

7. The method of claim 1, wherein the fiber-reinforced composite material is an electromagnetic wave shielding material.

8. The method of claim 7, wherein an average electric field shielding performance at a measurement frequency of from 1 to 1,000 MHz of the electromagnetic wave shielding material is at least 80 dB.

9. The method of claim 1, wherein the polyimide resin (A) layer is the film having the thickness of the film of from 200 to 500 μm.

* * * * *